United States Patent Office 2,834,738
Patented May 13, 1958

2,834,738

PRODUCTION OF SKELETAL GLASS CATALYSTS

George Clarkson Vincent, Norton-on-Tees, England, assignor to Imperial Chemical Industries Limited, London, England, a corporation of Great Britain No Drawing. Application August 8, 1955
Serial No. 527,120

Claims priority, application Great Britain August 25, 1954

4 Claims. (Cl. 252—432)

This invention relates to the production of skeletal glass catalysts.

It is known to produce skeletal glass catalysts by a process which comprises the steps of fusing a mixture of suitable materials to form a glass, heating the glass to cause separation of phases and extracting a soluble phase. Thus, for example, co-pending U. S. application Serial No. 470,546 describes the production of a skeletal glass catalyst containing silica and alumina from a mixture of materials containing alumina, silica, boric oxide and an alkaline earth.

It is also known to apply processes of granulation, extrusion and pelleting in the production of non-skeletal glass catalysts.

The application of the known processes of catalyst granulation to the granulation of skeletal glass catalysts is not practicable and the production of a pelleted skeletal glass catalyst using a punch and die would be difficult because of the poor plasticity of glass. Also, in such a pelleting process it would be necessary to use a large quantity of lubricant and the wear and tear on the punches and dies used would be excessive due to the abrasive nature of glass.

Blocks or sheets of skeletal glass may be broken up mechanically to obtain pieces of a size suitable for use in catalytic processes. This method is wasteful since considerable quantities of fine material are formed which are, in practice, unsuitable for use as a catalyst in many processes. Also the use in a catalytic process of pieces of broken glass, which have an irregular shape, leads to considerable loss of catalyst by abrasion.

We have now found that by producing skeletal glass catalysts in the form of sintered aggregates there are obtained mechanically strong, highly porous catalysts which may have a higher catalytic activity in many processes, particularly diffusion limited processes, than a skeletal glass catalyst of the same composition used in the form of small pieces of broken glass. This higher catalytic activity is thought to be due to the fact that the sintered glass aggregates may satisfactorily contain skeletal glass particles of a size too small for use as a catalyst in the non-aggregated form.

According to the invention, therefore, there is provided a process for the production of a skeletal glass catalyst in the form of a sintered aggregate which comprises the steps of fusing a mixture of materials containing one or more catalytically active ingredients to form a glass, subjecting the glass to a temperature sufficient to cause separation of the glass into phases at least one of which is soluble in an extraction medium, reducing the glass to particles of a suitable size, subjecting the particles to a temperature sufficient to cause them to cohere to form an aggregate and extracting from the aggregate at least part of at least one soluble phase.

A variety of mixtures of materials containing a catalytically active ingredient may be used in the process of the invention. A very suitable mixture of materials comprises alumina, silica, boric oxide and an alkaline earth, preferably in such proportions as to yield on fusion a glass having the following composition:

| | Percent |
|---|---|
| Alumina | 10–35 |
| Silica | 30–60 |
| Alkaline earth | 5–20 |
| Boric oxide | 12–22 |

The glass may be reduced to particles by any convenient method for example, by crushing or grinding. It is preferred that the particles are of a size such that they will at least pass a sieve having a ⅛ inch aperture.

It is to be understood that the glass may be reduced to particles prior to the phase separation process or that the size reduction process may be carried out in stages before and after the phase separation process. However, if the size reduction process involves melting the glass it must be carried out before the phase separation process.

The phase separation process may be carried out by any convenient method. For example, if the glass is prepared from a mixture comprising alumina, silica, boric oxide and an alkaline earth the glass may be heated at 650–950° C. for about 24 hours.

Following the phase separation process the glass may be extracted with a variety of acid and alkaline extraction media, the choice of a particular medium depending on the composition of the glass. Dilute boiling hydrochloric acid is a very convenient extraction medium.

The glass aggregates may be of any size or shape suitable for use in a reactor. They may be for example of cylindrical or spherical shape and they may be formed by a variety of processes. For instance, the glass particles may be heated while retained in a mould, preferably made in two sections for ease of removal of the aggregate. Alternatively, the glass particles may be mixed with a lubricant, extruded in the form of a rod of suitable diameter which is then cut into pieces of a suitable length and the heating process applied to these pieces of extruded rod.

*Example 1*

20 parts of alumina, 35 parts of silica, 10 parts of calcium oxide and 40 parts boric oxide were thoroughly mixed in powder form and fused at 1500° C. to give a glass having the following composition:

| | Percent |
|---|---|
| Alumina | 24.7 |
| Silica | 35.0 |
| Calcium oxide | 8.9 |
| Boric oxide | 29.1 |

The glass was divided into two portions. One portion was broken up into fragments which were mostly about 3 mm. in size but some of which were smaller and the fragments sintered at 850° C. for 24 hours to give suitable aggregates. A soluble phase was then extracted from these aggregates by immersion in hot N/2 hydrochloric acid for 3 hours, and the aggregates washed with water and dried.

The other portion of the glass was broken up into pieces of about 3 mm. size, heated at 850° C. for 24 hours to cause phase separation without sintering and a soluble phase then extracted as described above.

The activities of the sintered and unsintered skeletal glass catalysts were then compared in the debutylation of tertiary-butyl benzene, the tertiary-butyl benzene being passed at a rate of 5 litres per litre of catalyst filled space per hour through a bed of the catalyst maintained at a temperature of 400° C. The sintered glass skeletal catalyst gave a conversion of 48.6% and the unsintered glass skeletal catalyst a conversion of 41.5%, conversion being expressed as moles benzene produced per 100 moles tertiary-butyl benzene processed.

*Example 2*

20 parts alumina, 40 parts silica, 10 parts calcium oxide and 45 parts boric oxide were thoroughly mixed in powder form and fused at 1400° C. for 5½ hours to produce a glass. The glass was broken up mechanically into fragment about 3/16 inch to ¼ inch size and heated at 900° C. for 24 hours to cause phase separation. The glass fragments were then further broken up to give fragments most of which passed at No. 16 B. S. sieve and most of which were retained on a No. 30 B. S. sieve. These fragments were then sintered together at 900° C. for 1¼ hours to give cylindrical aggregates 3 inch long and 1 inch diameter which were then extracted with boiling normal hydrochloric acid solution for 2 hours, washed with water and dried. 31% by weight of the material originally present in the aggregates was removed during the extraction process; the aggregates were however, still mechancially strong.

The catalytic activity of the aggregates was then tested in the debutylation of tertiary-butyl benzene. Tertiary-butyl benzene was vaporized and passed at a rate of 10 litres of liquid tertiary butyl benzene per litre of catalyst filled space per hour through a reactor of 1 inch internal diameter containing the aggregates maintained at a temperature of 400° C. The conversion expressed as moles benzene produced per 100 moles tertiary-butyl benzene processed was 52.4%.

I claim:

1. A process for the production of a skeletal glass catalyst in the form of a sintered aggregate which comprises the steps of subjecting a glass having the composition:

| | Percent |
|---|---|
| Alumina | 10–35 |
| Silica | 30–60 |
| Alkaline earths | 5–20 |
| Boric oxide | 12–22 | to a temperature from 650° to 950° C. for a period of at least about 24 hours to cause a phase separation wherein at least one phase is soluble in mineral acid, reducing the glass to particles of a suitable size, and thereafter subjecting the particles to a sintering temperature to form an aggregate and extracting with said mineral acid for a period of about 2 to 3 hours to remove at least part of one soluble phase from said aggregate.

2. The process of claim 1 wherein the reduction of size is carried out prior to subjecting the glass to the phase separation heating step.

3. The process of claim 1 wherein the particle size is at least small enough to pass a sieve having a one-eighth inch aperture.

4. The process of claim 1 wherein said extraction is carried out with boiling hydrochloric acid.

References Cited in the file of this patent

UNITED STATES PATENTS

| | | |
|---|---|---|
| 2,500,092 | Parker | Mar. 7, 1950 |
| 2,500,801 | Church | Mar. 14, 1950 |
| 2,504,001 | Connolly | Apr. 11, 1950 |
| 2,515,943 | Stookey | July 18, 1950 |